(12) United States Patent
Chew et al.

(10) Patent No.: US 11,460,681 B2
(45) Date of Patent: Oct. 4, 2022

(54) CODED ZOOM KNOB, MICROSCOPE HAVING THE SAME AND METHOD FOR RETROFITTING A CODED ZOOM KNOB

(71) Applicant: LEICA INSTRUMENTS (SINGAPORE) PTE. LTD., Singapore (SG)

(72) Inventors: Chee-Keong Chew, Singapore (SG); Peng Liu, Singapore (SG); Andreas Bosch, Weissbad (CH)

(73) Assignee: LEICA INSTRUMENTS (SINGAPORE) PTE. LTD., Singapore (SG)

( * ) Notice: Subject to any disclaimer, the term of this patent is extended or adjusted under 35 U.S.C. 154(b) by 90 days.

(21) Appl. No.: 17/005,864

(22) Filed: Aug. 28, 2020

(65) Prior Publication Data

US 2020/0393663 A1    Dec. 17, 2020

Related U.S. Application Data

(63) Continuation of application No. 15/895,338, filed on Feb. 13, 2018, now Pat. No. 10,816,785.

(30) Foreign Application Priority Data

Feb. 27, 2017 (EP) .................... 17158143

(51) Int. Cl.
*G02B 21/24* (2006.01)
*G02B 21/02* (2006.01)

(52) U.S. Cl.
CPC ......... *G02B 21/025* (2013.01); *G02B 21/241* (2013.01)

(58) Field of Classification Search
None
See application file for complete search history.

(56) References Cited

U.S. PATENT DOCUMENTS

| | | | |
|---|---|---|---|
| 5,396,063 | A | 3/1995 | Ito et al. |
| 5,825,531 | A | 10/1998 | Otomo |
| 6,384,967 | B1 | 5/2002 | Watanabe et al. |
| 7,903,330 | B2 | 3/2011 | Studer et al. |
| 2003/0015978 | A1 | 1/2003 | Sulik |
| 2005/0094262 | A1 | 5/2005 | Spediacci et al. |
| 2007/0019288 | A1* | 1/2007 | Karasawa ............ G02B 21/025 359/380 |
| 2008/0144168 | A1 | 6/2008 | Studer et al. |
| 2015/0035965 | A1 | 2/2015 | Winterot et al. |
| 2017/0076481 | A1 | 3/2017 | Koga |
| 2017/0285321 | A1 | 10/2017 | Azuma et al. |

FOREIGN PATENT DOCUMENTS

| | | |
|---|---|---|
| CN | 101504484 A | 8/2009 |
| CN | 104216102 A | 12/2014 |
| CN | 204883037 U | 12/2015 |
| EP | 1746450 A1 | 1/2007 |

* cited by examiner

*Primary Examiner* — Derek S. Chapel
(74) *Attorney, Agent, or Firm* — Hodgson Russ LLP

(57) ABSTRACT

The present invention relates to a coded zoom knob (3) for detecting the rotation of the zoom drive shaft (4) of a zoom system (10) of a microscope (1), comprising a magnet (34) coupled to the zoom drive shaft (4), and a magnetic sensor (43) rotatably decoupled from the magnet (34) for sensing a rotation of the magnet (34).

11 Claims, 2 Drawing Sheets

CODED ZOOM KNOB, MICROSCOPE HAVING THE SAME AND METHOD FOR RETROFITTING A CODED ZOOM KNOB

CROSS REFERENCE TO RELATED APPLICATIONS

This application is a continuation of U.S. application Ser. No. 15/895,338 filed Feb. 13, 2018, and claims priority of European patent application number 17158143.2 filed Feb. 27, 2017, the entire disclosure of which is incorporated by reference herein.

FIELD OF THE INVENTION

The present invention relates to a coded zoom knob, a microscope having the same and a method for retrofitting a microscope with a coded zoom knob. The invention further relates to a method for operating such a microscope.

STATE OF THE ART

Microscopes having zoom systems allowing a continuously adjustable magnification of objects to be observed are widely know in the prior art. The range of magnification provided by the zoom system can be characterized by a so-called zoom factor or magnification factor of the zoom system. When imaging an object, especially by using a camera, it is useful to know the respective magnification of the zoom system. Especially, it is advantageous to track the current magnification and save the magnification information together with the image generated by the camera. This is especially advantageous if microscope images of the same object are to be taken and compared at different points of time. High end microscopes such as high performance stereo microscopes usually comprise coded zoom systems where the rotation of the threaded spindle carrying the movable zoom lenses is detected and coded for providing the current magnification of the zoom system. The coded rotation of the threaded spindle corresponds to the magnification of the zoom system, which can be determined and saved and/or displayed together with the microscopic image. Such microscopes allow reproducible and comparable microscopic images.

However, less expensive zoom microscopes are not equipped with such a zoom coding system and up to now it is not possible to exchange zoom coding systems or to retrofit a microscope with such a zoom coding system. Such zoom microscopes typically comprise a zoom system driven by a zoom drive shaft which shaft is usually operated manually by a user of the microscope by rotating a zoom knob. Typically, two such zoom knobs are mounted on the left and on the right side of the zoom drive shaft axis of the microscope housing. By rotating one of said zoom knobs, the zoom drive shaft is rotated resulting in a movement of the movable lenses of the zoom system such that the magnification of the zoom system can be varied.

SUMMARY OF THE PRESENT INVENTION

To overcome the drawbacks of the prior art, the present invention provides a coded zoom knob, a microscope having such a coded zoom knob and a method for retrofitting a microscope according to the independent claims. Further, a method for operating such a microscope is provided. Advantageous embodiments are the subject matter of the dependent claims and the following description.

According to a first aspect of the present invention, a coded zoom knob for detecting the rotation of a zoom drive shaft of a zoom system of a microscope is provided. The coded zoom knob comprises a stator and a rotor rotatable in relation to the stator, the rotor being adapted to be mounted to the zoom drive shaft, and the stator comprising a rotation sensor for sensing a rotation of the rotor. The coded zoom knob according to the present invention comprises at least the elements necessary to sense or detect a rotation of the zoom drive shaft which itself drives the zoom system for varying the magnification of the zoom system. It should be noted that the coded zoom knob does not necessarily drive the zoom drive shaft, i.e. the coded zoom knob itself is preferably not rotatable. It is preferred that the zoom drive shaft is driven by a conventional zoom knob. The coded zoom knob according to the present invention is easily retrofittable to a conventional microscope having two zoom knobs, one at each end of the zoom drive shaft axis on the left and on the right side of the microscope housing, by replacing one of said conventional zoom knobs with a coded zoom knob.

According to a second aspect of the present invention, a method for retrofitting a microscope with a coded zoom knob according to the present invention is provided. Said microscope comprises at least one zoom knob for driving a zoom drive shaft of a zoom system of the microscope. The coded zoom knob comprises a stator and a rotor rotatable in relation to the stator, the stator comprising a rotation sensor for sensing a rotation of the rotor. The microscope is retrofitted with such a coded zoom knob by the steps of replacing one zoom knob for driving the zoom drive shaft by the coded zoom knob according to the present invention. Replacing one zoom knob by the coded zoom knob includes removing said one zoom knob, fitting the rotor of the coded zoom knob on the zoom drive shaft of the zoom system and fitting the stator of the coded zoom knob on a housing of the microscope.

According to a third aspect of the present invention, a microscope is provided comprising a zoom system, a zoom drive shaft for driving the zoom system, a zoom knob for operating or driving the zoom drive shaft and the coded zoom knob according to the present invention.

According to a fourth aspect of the present invention, a method for operating a microscope is provided which microscope comprises a coded zoom knob having an electronic assembly adapted to track or calculate a magnification information, such as a magnification or a parameter corresponding to the magnification, of the zoom system of the microscope on the basis of the determined rotation of the rotor. In this method, the magnification information of the zoom system is used to control an aperture of an illuminating beam path of the microscope.

Advantages and Embodiments of the Present Invention

By constructing the coded zoom knob as a separate component adapted to replace a conventional rotary zoom knob it can be mounted to a microscope that is not serially equipped with a zoom coding system. Such zoom microscopes usually comprise a zoom drive shaft mounted orthogonally to the zoom axis for driving the zoom system, i.e. for adjusting the positions of the lens groups of the zoom system. With the present invention, one of the original zoom knobs can be replaced by a coded zoom knob for coding the zoom magnification.

Preferably, the rotor comprises a magnet, while the stator comprises a magnet sensor as the rotation sensor. For the ease of illustration, in the following—without any limitation of the scope of protection—it is to be understood that the rotor comprises a magnet, while the stator comprises a magnet sensor like a Hall effect sensor.

The retrofitted coded zoom knob allows tracking the rotary position of the rotor in relation to the fixed stator and, thus, to track the adjusted zoom magnification.

In a preferred embodiment, the stator comprises an electronic assembly adapted to determine a rotation of the rotor in relation to the stator and, preferably, to track and/or to calculate a magnification information of the zoom system of the microscope on the basis of the determined rotation. The magnification information can, for example, be the current magnification itself or a value proportional to the magnification of the zoom system. It is advantageous if the electronic assembly is part of the fixed stator which is connected to the stationary housing of the microscope. The electronic assembly is preferably connected with a control unit and/or with a camera of the microscope. By receiving the output signal from the magnetic sensor, the electronic assembly can determine the rotary position of the rotor and calculate the magnification on the basis of the determined rotary position. It is also possible to dispose the electronic assembly outside the coded rotary zoom knob, i.e. inside a housing of the microscope, or even outside of the microscope housing. Signals can be transferred between the electronic assembly and the magnetic sensor via signal lines or in a wireless fashion. Same applies to the signals transferred between the electronic assembly and the control unit or the camera of the microscope.

In a preferred embodiment, the stator is adapted to be fitted on a housing of the microscope, especially on the zoom drive shaft axis of the microscope housing. The coded zoom knob can be of a similar design as the non-coded conventional zoom knob on the other side of the zoom drive shaft axis.

In a further preferred embodiment, the stator comprises a cap such that the cap forms a first axial end of the coded zoom knob and of the zoom drive shaft axis of the microscope housing.

In a preferred embodiment, the rotor comprises a central screw for mounting the rotor together with the coded zoom knob to the housing of the microscope. This allows an easy retrofitting of a coded zoom knob by connecting the rotor of the coded zoom knob with the microscope housing by a screw joint. It is advantageous if the microscope housing comprises an adapter member adapted to be connected with the central screw of the rotor of the coded zoom knob. The adapter member is especially formed in a way to be mounted to the microscope housing at a position where the original zoom knob was removed.

Preferably, the outside of the stator (together with the stator cap) encompasses all elements of the coded zoom knob as will be further described in connection with an embodiment of the present invention shown in the appended figures.

As already mentioned before, the coded zoom knob is retrofitted at either one of the two axial ends of the zoom drive shaft. The zoom drive shaft of a microscope comprises two axial ends at two lateral sides of the microscope. In this way, an operator may choose on which lateral side of the microscope he/she wants to retrofit the coded zoom knob.

According to still another aspect of the present invention, a microscope is provided comprising a coded zoom knob retrofitted to the microscope according to a method according to the present invention.

Finally, a method for operating a microscope according to the present invention is provided, wherein a magnification information of the zoom system is used to control an aperture of an illuminating beam path of the microscope. A magnification information can be tracked or even calculated by an electronic assembly as described above in relation to the method according to the invention. Usually, the higher the magnification of the microscope, the more light is needed in the illuminating beam path in order to achieve an image of sufficient brightness. As the magnification of the zoom microscope can be tracked by the retrofitted coded zoom knob, the corresponding magnification information can be advantageously used to control an illumination aperture of the microscope.

DESCRIPTION OF THE FIGURES

Further embodiments and advantages of the claimed invention become apparent from the attached figures in combination with the following description.

DETAILED DESCRIPTION OF THE INVENTION

Figure 1:
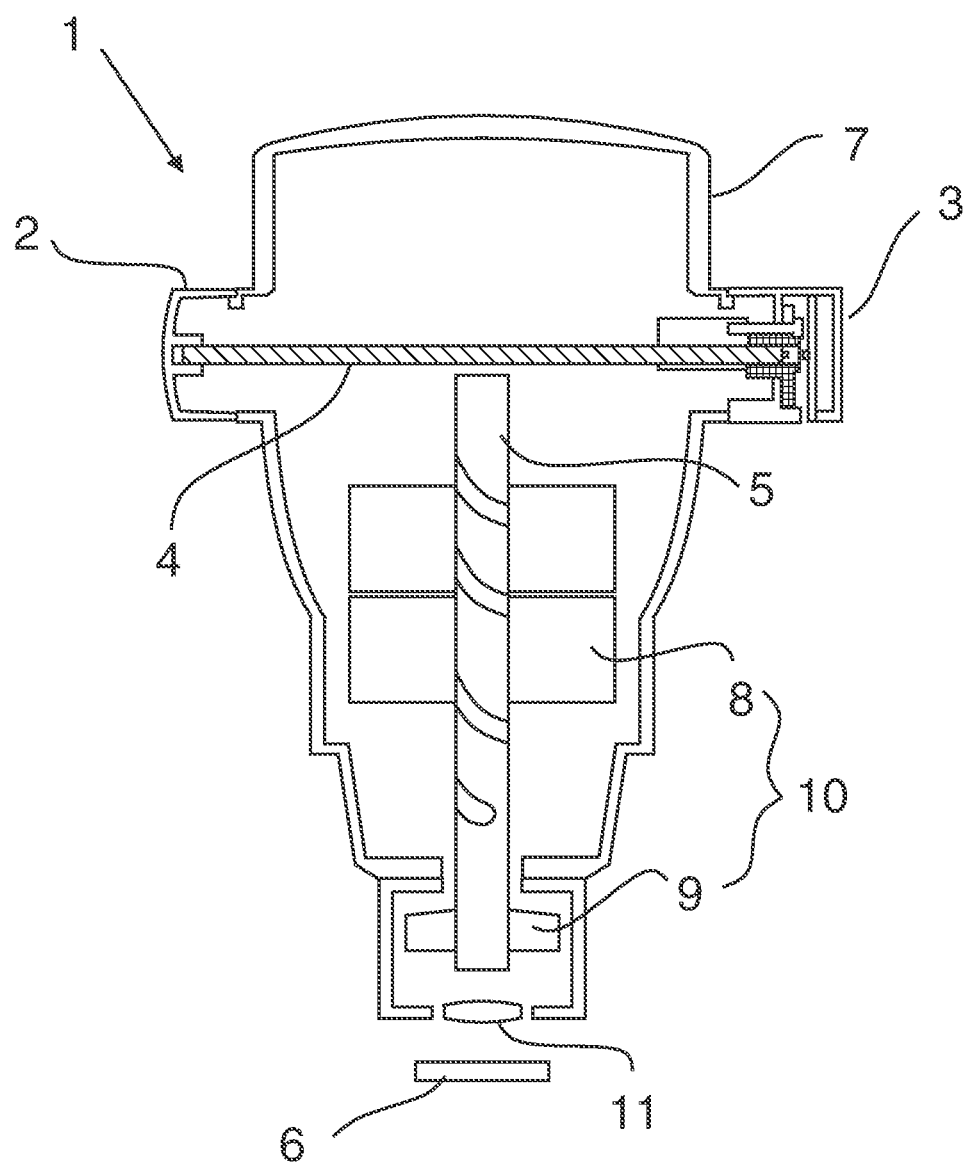
FIG. 1 shows in a schematic way a microscope with a retrofitted coded zoom knob.

FIG. 1 schematically shows a microscope 1 comprising a housing 7, a zoom system 10 and an objective 11. The sample or object to be imaged by the microscope is designated 6. The positions of a part of the lens groups 8, 9 of the zoom system 10 can be adjusted by a threaded spindle 5 along the zoom axis. The threaded spindle 5 itself is driven by the zoom drive shaft 4.

As can be seen from FIG. 1, the microscope 1 has a non-coded conventional zoom knob 2 and a retrofitted coded zoom knob 3. The non-coded zoom knob 2 can be rotated by an operator of the microscope 1. By rotating the zoom knob 2, the zoom drive shaft 4 is rotated, which rotation results in a rotation of the threaded spindle 5 carrying the movable lens groups of the zoom system 10. A movement of one or more of the lens groups 8, 9 (depending on the type of the zoom system) results in a variation of the zoom magnification. The zoom magnification is therefore a function of the rotation of the zoom drive shaft 4. Thus, a magnification information can be derived from a determined rotation of the zoom drive shaft 4. To this purpose, a coded zoom knob 3 is retrofitted to the microscope 1.

Figure 2:
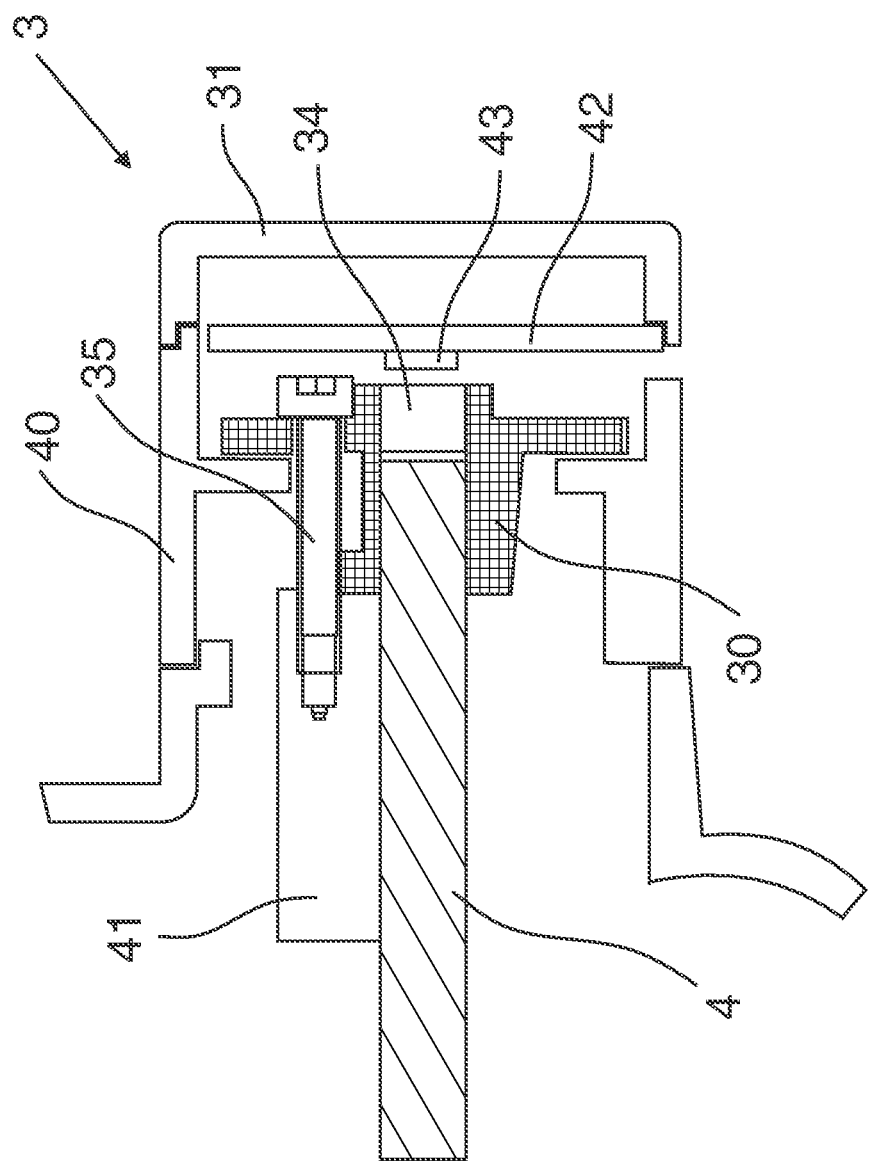
FIG. 2 shows an enlarged view of the retrofitted coded zoom knob of FIG. 1.

Details of the retrofitted coded zoom knob 3 are shown in FIG. 2.

The coded zoom knob 3 comprises a rotor 30 and a stator 40. The rotor 30 is rotatable around a central longitudinal axis in relation to the fixed stator 40. The rotor 30 comprises a central screw 35 by which the coded zoom knob is fitted in a screw joint mode to an adaptor member 41 of the housing 7 of the microscope 1. Further, the rotor 30 comprises a magnet 34 in line with the zoom drive shaft 4.

The stator 40 comprises a magnetic sensor 43, like a well-known Hall effect sensor, and, in the embodiment shown in FIG. 2, an electronic assembly 42 that allows determination of the rotary position of the magnet 34 in relation to the magnetic sensor 43 and thus calculation of a magnification information of the zoom system 10. The magnetic sensor 43 and the electronic assembly 42 are stationary and fixed to the stator 40. Furthermore, the stator 40 comprises an outer housing including a cap 31 formed to be mounted to the housing 7 of the microscope 1 at a position of a removed non-coded zoom knob (see zoom knob 2 of FIG. 1). As can be seen from FIG. 2, the outer housing including the cap 31 encompasses the other elements of the coded zoom knob 3.

As can be seen from FIG. 2, another embodiment is possible where the rotor 30 with the zoom drive shaft 4 is connected to a cap 31 such that by rotating the cap 31 the zoom drive shaft 4 can be operated by an operator. In this case, at least the magnetic sensor 43 would have to be connected to the fixed stator 40 such that the magnetic sensor 43 is able to detect a rotation of the magnet 34. The electronic assembly 42 could also be place into the stator 40 but also, in principle, into the cap 31 if the magnetic sensor 43 and the electronic assembly 42 communicate wirelessly.

LIST OF REFERENCE NUMERALS 1 microscope
2 non-coded zoom knob
3 coded zoom knob
4 zoom drive shaft
5 threaded spindle
6 sample
7 housing
8 lens group
9 lens group
10 zoom system
11 objective
30 rotor
31 cap
34 magnet
35 screw
40 stator
41 adapter member
42 electronic assembly
43 magnetic sensor

What is claimed is:

1. A microscope comprising:
a microscope housing;
a zoom system;
a zoom drive shaft rotatable about a zoom drive shaft axis for driving the zoom system;
a first zoom knob coupled to the zoom drive shaft, wherein the first zoom knob is manually rotatable about the zoom drive shaft axis to rotate the zoom drive shaft about the zoom drive shaft axis; and
a second zoom knob mounted on the zoom drive shaft, wherein the second zoom knob includes a magnet coupled to the zoom drive shaft for rotation with the zoom drive shaft and a magnetic sensor rotatably decoupled from the magnet such that the magnet and the zoom drive shaft rotate about the zoom drive shaft axis relative to the magnetic sensor,
wherein the second zoom knob further includes an outer housing, and the magnet and the magnetic sensor are contained within the outer housing of the second zoom knob at a location outside of the microscope housing.

2. The microscope according to claim 1, wherein the second zoom knob is removably mounted on the zoom drive shaft.

3. The microscope according to claim 1, wherein the magnet is coaxial with the zoom drive shaft on the zoom drive shaft axis.

4. The microscope according to claim 1, wherein the outer housing of the second zoom knob includes a stator to which the magnetic sensor is coupled.

5. The microscope according to claim 4, wherein the outer housing of the second zoom knob further includes a cap rotatable about the zoom drive shaft axis to rotate the zoom drive shaft.

6. The microscope according to claim 1, wherein the outer housing of the second zoom knob is entirely outside the microscope housing.

7. A coded zoom knob comprising:
a magnet configured to be coupled to a zoom drive shaft of a microscope for rotation with the zoom drive shaft about a zoom drive shaft axis; and
a magnetic sensor rotatably decoupled from the magnet such that the magnet and the zoom drive shaft rotate about the zoom drive shaft axis relative to the magnetic sensor; and
an outer housing, wherein the magnet and the magnetic sensor are contained within the outer housing such that the magnet and the magnetic sensor are located outside of a microscope housing of the microscope,
wherein the coded zoom knob is configured to replace a non-coded zoom knob of the microscope when the coded zoom knob is coupled to the zoom drive shaft.

8. The coded zoom knob according to claim 7, wherein the magnet is coaxial with the zoom drive shaft on the zoom drive shaft axis.

9. The coded zoom knob according to claim 7, wherein the outer housing of the coded zoom knob includes a stator to which the magnetic sensor is coupled.

10. The coded zoom knob according to claim 9, wherein the outer housing of the coded zoom knob further includes a cap rotatable about the zoom drive shaft axis to rotate the zoom drive shaft.

11. The coded zoom knob according to claim 7, wherein the outer housing of the coded zoom knob is entirely outside the microscope housing when the coded zoom knob is coupled to the zoom drive shaft.

* * * * *